No. 739,185. PATENTED SEPT. 15, 1903.
J. KEARNEY.
BUTTON.
APPLICATION FILED FEB. 21, 1903.
NO MODEL.
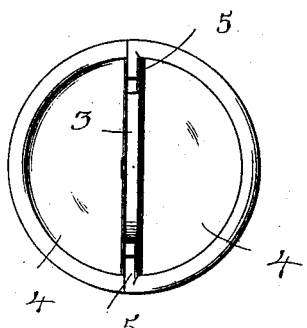
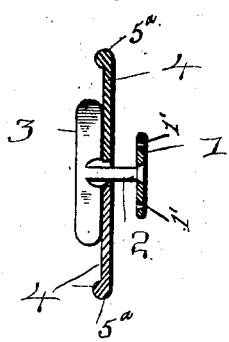
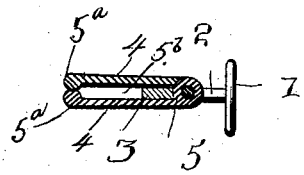
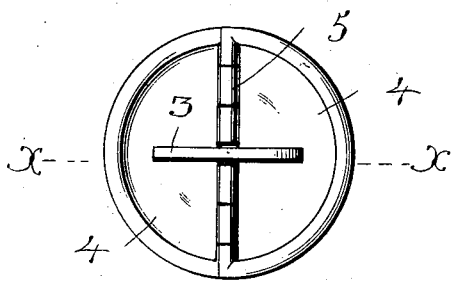
WITNESSES:
F. W. Riley
Herbert D. Lawson
INVENTOR
John Kearney.
BY Victor J. Evans
Attorney No. 739,185. Patented September 15, 1903.

UNITED STATES PATENT OFFICE.

JOHN KEARNEY, OF LOUISVILLE, KENTUCKY.

BUTTON.

SPECIFICATION forming part of Letters Patent No. 739,185, dated September 15, 1903.

Application filed February 21, 1903. Serial No. 144,368. (No model.)

*To all whom it may concern:*

Be it known that I, JOHN KEARNEY, a citizen of the United States, residing at Louisville, in the county of Jefferson and State of Kentucky, have invented new and useful Improvements in Buttons, of which the following is a specification.

My invention has relation to improvements in buttons; and it consists in the construction and arrangement of parts, as will be hereinafter described, and particularly pointed out in the claim.

In the accompanying drawings, Figure 1 is a plan view of the button, showing the cross-bar in position over the hinges. Fig. 2 is a plan view showing the sections locked by the cross-bar. Fig. 3 is a section on line $x\,x$, Fig. 2. Fig. 4 is a section showing the wings in a closed position.

Referring to the figures by numerals of reference, 1 designates a disk having a plurality of perforations 1', by means of which said disk is secured to a garment, and this disk has a turnable stem 2, mounted centrally therein, and on this stem is movably secured semicircular wings 4, hinged together, as shown at 5. To the upper end of the stem is secured a cross-bar 3, which is adapted to be shifted by means of the movement of the stem of the disk 1 so as to be in a parallel plane with the hinges of the wings, as shown in Fig. 1, whereby to permit of the wings being raised in an upright position, as shown in Fig. 4. When the wings are in this raised position, they are adapted to be inserted through a buttonhole and prevented from being withdrawn therefrom by bringing the wings down to their normal position and by turning the cross-bar 2 over the sections of the wings, as shown in Fig. 3, which permits of said cross-bar locking the wings in normal position. The semicircular wings are provided with edge flanges $5^a$, whereby when said sections are brought together in an upright or folded position, as shown in Fig. 4, they serve to form a semicircular recess $5^b$ between them to permit of the inclosing of the cross-bar in a position above the hinge-joint of the wings during the operation of insertion or passing of said section of wings through a buttonhole.

The structure of the button is especially adapted for use in torn or frayed buttonholes and can be quickly inserted therein by folding the wings together in a manner hereinbefore described.

Having described my invention, what I claim is—

A button comprising a perforated disk having a rotating stem therein, and sections of semicircular wings hinged together and movably mounted on the stem, said wings also having marginal edge flanges which serve to form a semicircular recess between the same when folded together, a cross-bar secured to the stem above the wings and adapted to be moved so as to extend parallel with the hinges of the wing-sections and also to be inclosed within the recess of the same, and said cross-bar serving to lock the wings by turning the same across and over the wings when in normal position, substantially as specified.

In testimony whereof I affix my signature in presence of two witnesses.

JOHN KEARNEY.

Witnesses:
FRANK L. SMITH,
EMMA DOZIER.